United States Patent [19]

Pearce et al.

[11] 4,289,738
[45] Sep. 15, 1981

[54] PROCESS FOR REMOVING $H_2S$ FROM SOUR GASES WITH GENERATION OF A CLAUS FEED GAS

[75] Inventors: Roscoe L. Pearce; Charles W. Martin, both of Lake Jackson, Tex.

[73] Assignee: The Dow Chemical Company, Midland, Mich.

[21] Appl. No.: 171,210

[22] Filed: Jul. 22, 1980

[51] Int. Cl.³ .............................................. B01D 53/34
[52] U.S. Cl. ................................... 423/228; 423/220; 423/229; 423/574 R
[58] Field of Search ............... 423/220, 224, 226, 228, 423/229, 574 L; 55/68, 72

[56] References Cited

U.S. PATENT DOCUMENTS

| | | | |
|---|---|---|---|
| 3,989,811 | 11/1976 | Hill | 423/228 |
| 4,001,386 | 1/1977 | Klein et al. | 423/574 L |
| 4,025,322 | 5/1977 | Fisch | 423/228 |
| 4,085,199 | 4/1978 | Singleton et al. | 423/574 R |
| 4,198,387 | 4/1980 | Laslo et al. | 423/228 |
| 4,210,627 | 7/1980 | Verloop et al. | 423/220 |

*Primary Examiner*—Earl C. Thomas
*Attorney, Agent, or Firm*—B. G. Colley

[57] ABSTRACT

Sour industrial gases containing carbon dioxide and hydrogen sulfide are treated with amines to remove the $CO_2$ and $H_2S$. The amine absorbent containing or loaded with $H_2S$ and $CO_2$ is regenerated and the off-gas containing concentrated amounts of $H_2S$ and $CO_2$ is treated in a second amine absorber to produce an amine absorbent loaded with $H_2S$. This amine is then regenerated to provide an off-gas containing a high ratio of $H_2S$ to $CO_2$ which makes it suitable for use as the feed gas to a sulfur recovery unit such as a Claus plant. The process is automatically controlled so that the concentration of $H_2S$ in the second amine absorber is built up to and controlled at a desired set point so that the off-gas has the required $H_2S/CO_2$ ratio.

4 Claims, 1 Drawing Figure

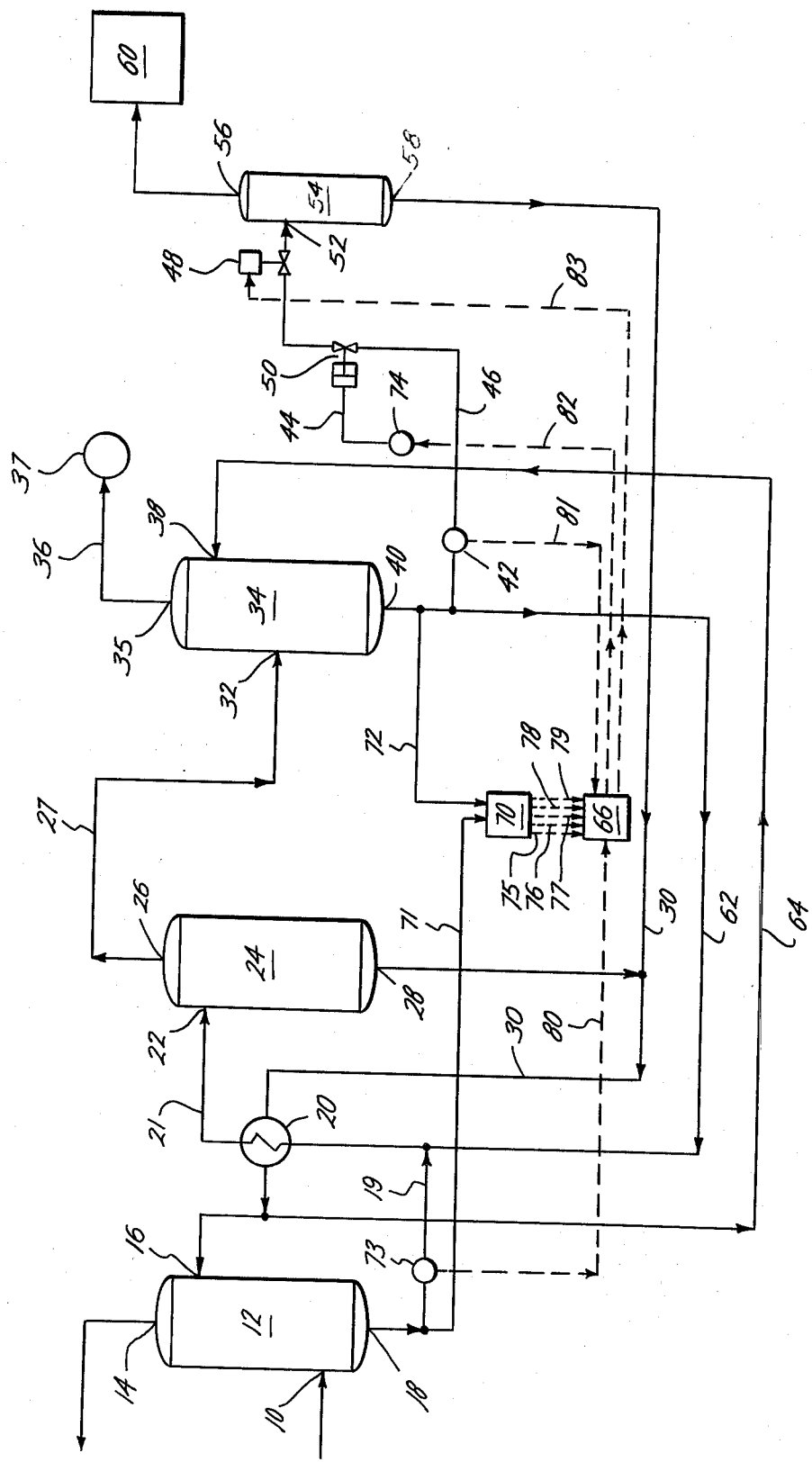

PROCESS FOR REMOVING H₂S FROM SOUR GASES WITH GENERATION OF A CLAUS FEED GAS

BACKGROUND OF THE INVENTION

The removal of $H_2S$ and other acid gases such as $CO_2$ from sour industrial gases with various amines and the regeneration of the amines with the production of a concentrated off gas containing $H_2S$ and $CO_2$ which is useful as a feed gas to a Claus sulfur recovery unit is well known in the art as is illustrated by U.S. Pat. No. 4,085,199 dated Apr. 18, 1978.

The present art thus provides for selective removal of $H_2S$ with various solvents, however the degree of selectivity is less than 100%. If an acid gas or off-gas of increased $H_2S$ content over the off-gas composition of a first regenerator is desired, one must install a complete second plant, a third, fourth, et cetera until the desired level of $H_2S$ in the acid gas is achieved. Each stage requires a separate contactor and regenerator.

The extension of the prior art, one stage selective $H_2S$ removal, would thus be a multiple stage contact and regeneration. This method will require low energy (restricted to solvent circulation and solvent regeneration) but will be a high capital project due to the multiple tower configuration and the inflexibility of said configuration which will have a very narrow operating range in regard to feed composition and feed volume.

The lower range for the $H_2S/CO_2$ feed to a Claus unit is 20 to 25% by volume of $H_2S$. However, there are special techniques that claim feasible and economically viable operation with as little as 5% $H_2S$ in the Claus feed but with a relatively great increase in both capital and treating costs. There is thus need in the art for a process which will increase the concentration of $H_2S$ in the Claus feed gas with relatively lower energy requirements and capital investments since in so doing the Claus unit efficiency and overall treating costs will be improved.

In South African Pat. Nos. 7800645 and 7800644 to Shell Research, there are disclosed methods for increasing or adjusting the level of $H_2S$ in a $H_2S$—$CO_2$ natural gas or refinery stream so that the stream can be used as a feed stream to a Claus unit.

A limitation of the foregoing Shell processes is that (1) to achieve the desired $H_2S$ concentration of the Claus feed gas they require more energy i.e., heat input, than the present invention, (2) variations in the feed gas compositions are not perceived by the control units, and (3) in contrast to the previous art, the present invention can process low pressure gas streams as well as high pressure streams.

The present invention provides for automatic $H_2S$ analysis of the rich amine absorbent which controls the $H_2S$ content of the feed gas to a Claus unit independently of the variations in acid gas concentration of the feed gas.

SUMMARY OF THE INVENTION

This invention relates to a process whereby a sour industrial gas containing $CO_2$ and several fold lesser amounts of $H_2S$, as for example, a $CO_2:H_2S$ ratio ranging from about 5:1 to about 400:1, is treated with a solvent that is selective toward $H_2S$ in such a manner as to produce an acid gas with 3-4 fold increase in $H_2S$ concentration.

This acid gas stream is then further treated in a second contactor in which all of the $H_2S$ and only a small part of the $CO_2$ (example, 30%) is absorbed. The process is so designed as to allow the rich solvent stream to recycle to the regenerator until the $H_2S/CO_2$ ratio is at a desired level in the rich stream, then an amount of rich solution, containing proportional amounts of $H_2S$ entering the first absorber, is fed to a small second regenerator, the off-gas from which regenerator provides a feed gas to a Claus sulfur plant, Stretford or other sulfur recovery plant at any desired $H_2S/CO_2$ ratio.

The recycle is accomplished with a low energy consumption similar to a multi-stage plant producing the same $H_2S/CO_2$ ratio, but with a several fold reduction in capital over that of a multi-stage process.

The steps of the invention comprise (A) feeding a gas containing $CO_2$ and low amounts of $H_2S$ to a first amine absorber containing an aqueous amine solution to produce a first off gas useful as a fuel gas containing lower amounts of $H_2S$, a major portion of the $CO_2$ and a first rich amine, (B) feeding said rich amine loaded with $H_2S$ and $CO_2$ from said first amine absorber to a first amine regenerator wherein said amine is regenerated to produce a lean amine and a second off gas containing essentially $CO_2$ and relatively large amounts of $H_2S$ and said lean amine is recycled back to said first absorber, (C) feeding said second off gas to a second amine absorber to produce a third off gas containing substantially pure $CO_2$ and a second rich amine, (D) feeding said second rich amine loaded with $H_2S$ from said second absorber to said first regenerator together with said first rich amine from said first absorber, and (E) feeding a proportion of said second rich amine to a second amine regenerator wherein said amine is regenerated to produce an off gas suitable for the feed of a sulfur recovery process wherein the flow to said second amine regenerator is automatically controlled to provide a suitable off gas composition.

BRIEF DESCRIPTION OF THE DRAWING

The drawing is a schematic description indicating how the process of this invention is carried out. It is to be understood that the necessary pumps, pressure let down valves, and other standard equipment have not been illustrated since they unduly complicate the drawing.

In the drawing, the gas inlet 10 feeds an impure industrial gas containing acid gases into the first amine absorber or contactor 12 which has an inlet 16 for a lean or purified amine solution and an outlet 18 for the rich amine solution. The purified gas exits from the contactor 12 by way of the outlet 14 and still contains about 70% of the $CO_2$ which was present in the feed stream 10.

The rich amine flows through the line 19, cross exchanger 20, line 21, and inlet 22 into the first amine regenerator 24 wherein a $CO_2$—$H_2S$ off gas is produced. The off gas is removed by means of outlet 26 and line 27. The regenerated amine is removed by outlet 28 and flows into line 30 for recirculation through the heat exchanger 20 back to the first absorber 12 and to the second absorber 34 by means of line 64.

The $CO_2$—$H_2S$ off gas from the first regenerator 24 is fed by means of line 27 and inlet 32 into the absorber 34 where it is contacted with the lean amine from line 64 going through the inlet 38 to produce an off gas at the outlet 35 of substantially pure $CO_2$ with very little $H_2S$. The pure $CO_2$ is led by line 36 to a container 37 for storage and eventual use.

The rich amine from the second absorber 34 flows out of the outlet 40 into the recycle lines 62 and 46 back to the first regenerator 24. The rich amine also flows into line 46 and to the second regenerator.

However, line 46 is not open in the beginning of the operation of the unit due to the fact that the ball valve 48 is closed until the buildup of $H_2S$ in the rich amine reaches a desired set point such as 50% $H_2S$ for a Claus unit. This set point can be varied and is set by a manual setting of the computer 66. Thus, the rich amine continuously recycles to the first regenerator 24 and more $H_2S$ is added from line 19 until the desired level of $H_2S$ is achieved.

This desired level or set point is detected or sensed by the amine analyzer 70 working in conjunction with the sample lines 71 and 72 and the information is transmitted to the computer 66 which then signals the ball valve 48 to open and thereafter the flow control valve 50 is controlled by means of the transducer 74 so that the off-gas from the second regenerator 54 has the desired and/or predetermined percentage of $H_2S$.

From the foregoing, it is clear that once the desired set point is reached, the flow of rich amine to the second regenerator 54 will be controlled by the computer 66 to maintain the proper amount of $H_2S$ in the off-gas from the second regenerator 54.

If the $H_2S$ content of the feed gas going into amine absorber 12 by line 10 varies due to a change of supply gas, the change is immediately detected by the computer 66 and adjustments are made in the flow control valve 50 by the computer 66 so that the desired amount of $H_2S$ in the off-gas from the second regenerator 54 is maintained.

A sample line 71 takes a small sample of the rich amine from line 19 and carries it to the amine analyzer 70 which is commercially available under the trade name Amscor. Another sample line 72 takes a small sample of the rich amine from line 62 and carries it to the same analyzer 70.

The amine analyzer generates five signals which are transmitted by wires 75–79 to a micro computer 66 which is commercially available under the trade name Texas Instruments 550. The first three lines convey the analysis of the rich amine in line 19. Thus, line 75 carries the results of the $H_2S$ analysis, line 76 carries the results of the $CO_2$ analysis and line 77 carries the results of the amine analysis. On the other hand, line 78 carries the results of the $H_2S$ analysis of the rich amine in line 46 and line 79 carries the results of the $CO_2$ analysis of line 46.

The micro computer 66 also receives the input from the flow rate transmitters 73 and 42 in line 19 and 46 respectively by means of the electric lines 80 and 81. Thus, the micro computer receives all the above input and sends out signals by electric line 82 to control the electro pneumatic transducer 74 which in turn regulates the flow control valve 50. In the same manner, the electric signal sent by line 83 opens or closes the ball valve 48.

The rich amine from the second absorber 34 enters the second regenerator 54 by means of inlet 52 and is regenerated to produce a suitable off gas which leaves by means of outlet 56 to the Claus process unit 60.

The lean or regenerated amine leaves the regenerator 54 by means of the outlet 58 and is pumped through the line 30 back to the first absorber 12, thus completing the cycle.

DETAILED DESCRIPTION OF THE INVENTION

A detailed example of the invention is given below for purposes of illustrating the invention.

The feed gas to the system is 30,000 moles per hour of natural gas containing 600 moles per hour of $CO_2$ and 3 moles per hour of $H_2S$.

The feed gas is fed to a high pressure absorber at 1000 psig. The gas rises through the absorber containing suitable contact devices counter current to a 561 gallon per minute solution of 30% by weight methyldiethanolamine (MDEA) in water. Thirty percent of the $CO_2$ is absorbed in the rich solution together with essentially all of the $H_2S$, providing an MDEA solution containing 180 moles per hour $CO_2$ and 3 moles per hour of $H_2S$. The off-gas will therefore contain 70% of the $CO_2$ coming in the bottom of the absorber or 420 moles per hour of $CO_2$ and 1 to 4 ppm $H_2S$ by volume.

The rich solution from the bottom of the absorber is fed through a cross exchanger, a pressure let down valve and is comingled with a rich stream from the low pressure absorber containing 73 moles per hour of $H_2S$ and 73 moles per hour of $CO_2$ thus giving a combined feed of acid gas to the common regenerator of 76 moles per hour of $H_2S$ and 253 moles per hour of $CO_2$. The acid gas is essentially all regenerated in the regenerator with 76 moles per hour of $H_2S$ going overhead and 253 moles per hour of $CO_2$ also going overhead through an acid gas cooler and fed to a low pressure absorber. In the low pressure absorber, 30% of the $CO_2$ is picked up with 70% going overhead or at equilibrium/and or steady state 177 moles per hour of $CO_2$ and 1 to 4 ppm $H_2S$ is contained in the overhead stream. This gas stream may be sold for various applications where relatively pure carbon dioxide is needed. Examples of these are: beverage grade $CO_2$, tertiary oil recovery, and other known uses for $CO_2$.

The rich amine solution out of the bottom of the absorber contains 76 moles per hour of $H_2S$ and 76 moles per hour $CO_2$. A sample of rich amine from the high pressure absorber and a sample of the rich amine from the low pressure absorber is analyzed and compared by a commercial unit (Amscor or an equivalent unit). When the desired ratio or percentage of $H_2S$ is achieved, a control valve is activated by a micro computer thus opening the side stream line which has a flow rate of 9 gallons per minute of rich solution containing 3 moles per hour of $H_2S$ and 3 moles per hour of $CO_2$. This stream goes to a small regenerator in which essentially all of the $H_2S$ and $CO_2$ goes overhead and constitutes the Claus feed. The regenerated lean solution is combined with the lean solution from the main regenerator for recycle.

The circulation rate to the high pressure or primary absorber is 561 gallons per minute of 30% MDEA.

The low pressure or second absorber handles 152 moles per hour of acid gas at a sufficiently high partial pressure to allow a net loading of 0.5 mole of acid gas per mole of MDEA or 304 moles per hour MDEA which is 233 gallons per minute.

The circulation rate may be pre-set to the small side stream regenerator depending upon the concentration of $H_2S$ desired in the Claus feed. In this example 6 moles per hour of acid gas or 12 moles per hour of MDEA is required thus giving a 9.2 gallons per minute circulation rate to the small regenerator which provides the total Claus feed.

This example constitutes a low volume feed to the Claus unit, i.e. approximately one long ton of sulfur per day will be produced. It should be noted that this method of $H_2S$ enrichment to Claus feed is quite versatile and can be used in extremely low $H_2S$ concentrations to provide a small skid mounted or portable Claus unit with efficient performance and safe environmental handling of $H_2S$ while still providing a substantial by-product stream of $CO_2$, or provide a Claus feed stream to a large Claus unit (100 tons per day) with equal efficiency and simplicity of operation.

What is claimed is:

1. A process for treating a sour gas to prepare a fuel gas with relatively low amounts of hydrogen sulfide, and simultaneously prepare (1) a side stream of relatively pure carbon dioxide and (2) a side stream of a gas suitable for the feed to a Claus process having the required $H_2S/CO_2$ ratio which comprises
    (A) feeding a gas containing $CO_2$ and low amounts of $H_2S$ to a first amine absorber containing an aqueous amine solution to produce a first off gas useful as a fuel gas containing lower amounts of $H_2S$, a major portion of the $CO_2$ and a first rich amine,
    (B) feeding said rich amine loaded with $H_2S$ and $CO_2$ from said first amine absorber to a first amine regenerator wherein said amine is regenerated to produce a lean amine and a second off gas containing essentially $CO_2$ and relatively large amounts of $H_2S$ and said lean amine is recycled back to said first absorber,
    (C) feeding said second off-gas to a second amine absorber to produce a third off-gas containing substantially pure $CO_2$ and a second rich amine,
    (D) feeding said second rich amine loaded with $H_2S$ from said second absorber to said first regenerator together with said first rich amine from said first absorber, and
    (E) feeding a proportion of said second rich amine to a second amine regenerator wherein said amine is regenerated to produce an off gas suitable for the feed of a sulfur recovery process wherein the flow to said second amine regenerator is automatically controlled to provide a suitable off gas composition.

2. The process as set forth in claim 1 wherein said first and second rich amines are automatically analyzed and compared for $H_2S$ content and the flow rate and $H_2S$ content of said second rich amine to said second amine regenerator is automatically controlled.

3. The process as set forth in claim 1 wherein the amine used is an alkanol amine.

4. The process as set forth in claim 3 wherein the amine used is methyldiethanolamine.

* * * * *